US007246258B2

(12) United States Patent
Chen et al.

(10) Patent No.: US 7,246,258 B2
(45) Date of Patent: Jul. 17, 2007

(54) MINIMIZING RESYNCHRONIZATION TIME AFTER BACKUP SYSTEM FAILURES IN AN APPLIANCE-BASED BUSINESS CONTINUANCE ARCHITECTURE

(75) Inventors: Ying Chen, San Jose, CA (US); Binny Sher Gill, San Jose, CA (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 504 days.

(21) Appl. No.: 10/834,502

(22) Filed: Apr. 28, 2004

(65) Prior Publication Data

US 2005/0273654 A1      Dec. 8, 2005

(51) Int. Cl.
*G06F 11/00* (2006.01)
(52) U.S. Cl. ............................................. 714/6; 714/20
(58) Field of Classification Search ..................... 714/6, 714/15–20
See application file for complete search history.

(56) References Cited

U.S. PATENT DOCUMENTS

| 5,638,509 | A  | * | 6/1997  | Dunphy et al. ............... 714/20 |
| 6,301,677 | B1 |   | 10/2001 | Squibb |
| 6,381,674 | B2 |   | 4/2002  | DeKoning et al. |
| 6,397,307 | B2 | * | 5/2002  | Ohran ......................... 711/161 |
| 6,529,944 | B1 |   | 3/2003  | LeCrone |
| 6,549,921 | B1 | * | 4/2003  | Ofek ........................... 707/204 |
| 6,581,143 | B2 |   | 6/2003  | Gagne et al. |
| 6,598,131 | B2 |   | 7/2003  | Kedem et al. |
| 6,606,694 | B2 | * | 8/2003  | Carteau ....................... 711/162 |
| 6,611,901 | B1 |   | 8/2003  | Micka et al. |
| 6,631,477 | B1 |   | 10/2003 | LeCrone et al. |
| 6,636,908 | B1 |   | 10/2003 | Winokur et al. |
| 6,654,752 | B2 | * | 11/2003 | Ofek ............................ 707/10 |
| 6,732,125 | B1 | * | 5/2004  | Autrey et al. ............... 707/204 |
| 6,981,114 | B1 | * | 12/2005 | Wu et al. .................... 711/162 |
| 2003/0065780 | A1 |   | 4/2003 | Maurer, III et al. |
| 2003/0135385 | A1 |   | 7/2003 | Karpoff |
| 2003/0172157 | A1 |   | 9/2003 | Wright et al. |

(Continued)

OTHER PUBLICATIONS

U.K. Sarkar et al., "A simple 0.5-bounded greedy algorithm for the 0/1 knapsack problem", ScienceDirect—Information Processing Letters, vol. 42, Issue 3, May 1992, pp. 173-177.

(Continued)

*Primary Examiner*—Scott Baderman
*Assistant Examiner*—Brian Assessor
(74) *Attorney, Agent, or Firm*—John L. Rogitz

(57) ABSTRACT

A system for minimizing downtime in an appliance-based business continuance architecture is provided. The system includes at least one primary data storage and least one primary host machine. The system includes an intercept agent to intercept primary host machine data requests, and to collect information associated with the intercepted data requests. Moreover, at least one business continuance appliance in communication with the primary host machine and in communication with a remote backup site is provided. The appliance receives information associated with the intercepted data requests from the intercept agent. In addition, a local cache is included within the business continuance appliance. The local cache maintains copies of primary data storage according to the information received. Furthermore, the remote site is provided with the intercepted data requests via the business continuance appliance, wherein the remote site maintains a backup of the primary data storage.

50 Claims, 5 Drawing Sheets

U.S. PATENT DOCUMENTS

2005/0246575 A1* 11/2005 Chen et al. .................... 714/6

OTHER PUBLICATIONS

A. Chiaffitelli et al., "Business Continuity and High Availability Tutorial for Spring SNW 2003", Part 1 of 2, Apr. 14-17, 2003, 40 page presentation as available at http://www.snwusa.com/presentations.

Falconstor, Falconstor IP Appliance. 2003, available on the web at http://www.falconstor.com.

O. H. Ibarra et al., "Fast Approximation Algorithms for the Knapsack and Sum of Subset Problems", Journal of the Association for Computing Machinery, vol. 22, No. 4, Oct. 1975, pp. 463-468.

Kashya, Kashya data protection appliance, 2003, available on the web at http://www.dashya.com/solutions_architecture.jsp.

S. Martello et al., "New trends in exact algorithms for the 0-1 knapsak problem", Technical Report 97/10, DIKU, University of Copenhagen, Denmark, 1997. 9 pages.

H. Patterson et al., "SnapMirror: File System Based Asynchronous Mirroring for File Disaster Recovery", Proceedings of the FAST 2002 Conf. on File Storage Technologies, Monterey, CA, Jan. 28-30, 2002, pp. 117-129.

D. Pisinger, "Algorithms for Knapsack Problems", Technical Report Ph.D thesis, Dept. of Computer Science, University of Copenhagen, Denmark, 1995.

* cited by examiner

MINIMIZING RESYNCHRONIZATION TIME AFTER BACKUP SYSTEM FAILURES IN AN APPLIANCE-BASED BUSINESS CONTINUANCE ARCHITECTURE

FIELD OF THE INVENTION

This disclosure describes an invention that uses a small, fixed size memory and/or disk space to minimize the resynchronization time after failures in one or more backup system components in a business continuance architecture.

BACKGROUND OF THE INVENTION

In the information age, the importance of keeping data on-line at all times is becoming paramount. The need for Business Continuance (BC) and fast data recovery is acute and well-acknowledged. One solution to this problem is remote data replication (or remote mirroring). Remote mirroring can avoid or reduce data loss during site-wide disasters. It is also possible to guarantee continuous data access in the presence of site-wide failures by providing hot stand-by hosts and applications at the remote site and directing clients to the remote site when the primary site encounters a failure. Remote data replication comes in two flavors: synchronous and asynchronous. Only synchronous remote mirroring can avoid data loss during site-wide disasters, since a write from a calling application is not considered complete until the data is written successfully to both the local site and the remote site. However, this has a performance penalty on the applications. In asynchronous remote mirroring a write is considered to be completed just after writing to the local site. Subsequently, the updates are sent to the remote site as well. Thus, in a site-wide disaster, there would be data lost if there was some data pending to be sent to the remote site. However, an appliance-based architecture for remote mirroring is gaining popularity as it has the performance of asynchronous mirroring and almost the protection of synchronous mirroring.

In such an architecture, data is stored and accessed by applications running in the primary site. Primary hosts are defined to be the collection of hosts in the site that collectively serve all the I/O requests of the applications. On each one of these primary hosts an intercept agent is installed. These intercept agents collect and report all updates to the staging agent running in an appliance as shown in FIG. 1. The appliance could be connected to the local network (e.g. LAN) or could even be a few miles away (e.g. MAN). It is the duty of the staging agent to receive all updates from all the intercept agents in the primary site, keep them temporarily as local persistent logs which are then sent periodically to the backup agent. The backup agent runs on a remote site. It maintains a copy of the primary site's data by keeping it up-to-date with the updates as and when they are sent by the staging agent. The backup system components in such an architecture refer to the appliance and the remote backup hosts.

Because the appliance is close to the primary site, replication between the primary site and the appliance can be done synchronously without adding significant performance penalty to applications. The replication between the appliance and the remote backup site can be done asynchronously. The staging agent first logs the request received from the intercept agent in a persistent log. The application request can return as long as the request is done successfully on the primary host and is logged in the persistent log in the staging agent. In the background, the staging agent processes the persistent log, and batches multiple updates into large messages before sending them to the backup agent at the remote site. This significantly improves network utilization and hence reduces the overall replication cost. The overall architecture combines the benefits from both synchronous and asynchronous mirroring without adding significant drawbacks. Several vendors have built systems with such an architecture [5, 3]. Under this architecture, the persistent log at the staging agent and the secondary data copy at the remote backup site form a complete replica of the primary site's data copy.

Note that this replication solution does not lose data if the primary site disaster does not affect the appliance. This would be the most probable case if the appliance was on a MAN a few miles away. However, if both the primary site and the appliance face a disaster at the same time, then some data can be lost as the remote site is only updated asynchronously and might be missing some updates. In the worst case, the amount of missing updates is equal to the amount of updates in the persistent log in the appliance. This makes the guarantee of the architecture weaker than the traditional synchronous mirroring guarantee. However, this architecture covers a wide variety of failure cases with much more significant cost and performance advantages than synchronous mirroring. Recent field study shows that only 3% of the failure cases that incurred data loss and system downtime were caused by site-wide disasters [2]. Thus, the appliance based architecture works well for 97% of the failure cases, and even for some fraction of the site disasters that do not involve the given appliance. Hence, it is an attractive alternative to support efficient remote mirroring.

Given this architecture, recovery of the primary host site failures is straight-forward. One can simply switch to the remote site. The remote site must wait for all pending log requests in the appliance to be processed before serving any new requests. However, in the face of the appliance failure, the persistent log may no longer be available, hence some portion of the secondary data copy is lost. Unless some special techniques are used, recovery from the appliance failure can be extremely expensive. In the worst case, the entire data stored at the primary site may have to be copied to the remote site. In certain cases, it may be less costly to compare the primary site's data with the remote site's data and only resynchronize the data that are different between the two than to do a complete data copy. However, comparison itself requires reading of the entire data set at both sites. If checksums of data blocks are used to identify differences, both sites must compute checksums as well. Clearly, not only does this have a significant cost in terms of network bandwidth during data resynchronization, but also it potentially degrades the primary host application's performance for a long time. Furthermore, it may place the overall system in an unprotected mode for a long time if the primary site is not taken offline. Similarly, if the remote backup site encounters a failure, and is recovered from a tertiary backup (probably a tape library), then again the worst case would be to compare the entire primary site's data with the backup site's data, and resynchronize the differences. Assume that there is always a potentially out-of-date backup copy available even after backup system component failures. This is true for the appliance failures, since the data copy at the backup site is an out-of-date backup copy. For the remote backup site failures, assume that there is always a tape backup which can be used to restore the backup site to a certain point of time. To bring this secondary data copy, also called the backup data copy, to the state that is equivalent of the primary data, all updates made at the primary site since the point of time of the backup must be resynchronized. What is needed is a solution which addresses the problem of minimizing this resynchronization time after failures in the appliance and/or the remote backup site.

The potentially long resynchronization time after backup system component failures such as the appliance and the backup site failures is problematic. The long resynchronization time is due to the fact that the primary system does not keep track of what data must be resynchronized when one or more backup system components fail. The simplest and often slowest way of resynchronizing is to compare the entire data sets in both the primary and backup sites exhaustively and apply the differences to the backup. If the amount of data in the primary site is large, this process can be extremely slow. If the primary host knows what data must be resynchronized after failures, then only those data sets need to be recovered from the primary copy to the backup copy. For instance, in the case of the appliance failure, the only data that needs to be recovered is the data that was in the persistent log in the staging agent. Similarly, if the remote site failed. The remote host recovery process can first restore the remote site to the last tape backup. After that, only the updates that have been done since that tape backup must be recovered from the primary site. If such differences can be easily identified, recovery of the backup system components will not be very expensive. In general, the difference between the two versions of data copies can range from a few seconds worth of updates to many hours or even days worth of updates depending on the deployment scenario.

One way to track such differences between the primary data copy and the data on the remote site and the appliance is by using the point-in-time snapshot capability on the primary and the remote sites. The idea is to let the primary hosts take periodic snapshots. The remote site also keeps snapshots but lags behind in the updates. When the appliance fails, the remote hosts can find out the latest snapshot for which they have received all updates. All changes made since that snapshot form a superset of the changes that were in the appliance's persistent log when it died. As long as the primary host has an efficient way of identifying the changes since that snapshot indicated by the remote site, it suffices to just send only those changes to the replica to ensure a complete replica at the remote site. Similarly, if the remote site failed, and it is first restored to the last tape backup. Assuming that the last tape backup corresponds to some snapshot N, then the data that needs to be recovered is the set of the changes made since snapshot N. The primary host can use snapshot information to identify the changed data, and hence recover only a subset of data, instead of the entire volumes of file systems.

Although the above approach significantly reduces the data resynchronization times, it requires the primary host to have appropriate snapshot capabilities, thus creating a system software dependency. The remote backup also needs to be aware of snapshots and capable of utilizing that feature. Further, it imposes a requirement on the snapshot scheduling on the primary site to facilitate quick resynchronization of the backup site or the appliance when a backup component fails. Even with snapshots, the primary site must be able to quickly identify the set of changes made since a given snapshot that the backup is up-to-date with. To facilitate this, the software should avoid a complete snapshot metadata scan as it can be very expensive and performance degrading to host applications. However, schemes that avoid snapshot metadata scan often introduce performance penalties for the primary host data processing. Depending on the complexity of the software, in some cases, the host applications may have to be stopped for the scan to complete. Network Appliance's filers [8] use snapshots for such failure cases. However, such architectures depend on uniformity of software or appliances being used in the primary and the backup sites.

Several methods have been deployed to alleviate the above problem by keeping track of updates in some logs at the primary site in a way other than snapshots. The records in such logs indicate what data has been changed so that only such data needs to be resynchronized when backup system components are recovered. However, even these solutions have a problem because they do not work well with bounded resources. Once the space allocated for the logs is full, these algorithms resort to either forcing all applications to stop generating further updates (thus causing downtime), or they stop accumulating the log and thus exposing the system data loss if the primary site encounters a failure during the long and painful process of comparing the primary and backup versions exhaustively.

Therefore, there remains a need for an efficient resynchronization method to deal with a wide varieties of backup system component failures.

SUMMARY OF THE INVENTION

According to the present invention, there is provided a system for minimizing data resynchronization time after backup system component failures in an appliance-based business continuance architecture. The system includes at least one primary data storage. In addition, the system includes at least one primary host machine, wherein the primary host machine can access data stored at the primary data storage. Also, the system includes an intercept agent at the at least one primary host machine to intercept data requests and collect information regarding the intercepted data requests, wherein the intercepted data requests include data read requests and data write requests. Also, the system includes a summary log at the at least one primary host machine to maintain the collected information. Moreover, at least one business continuance appliance in communication with the intercept agent at the primary host machine and in communication with a remote backup site, wherein the business continuance appliance receives information associated with the intercepted data requests from the intercept agent at least one business continuance appliance in communication with the intercept agent and in communication with a remote backup site, wherein the business continuance appliance receives the collected information from the intercept agent. In addition, a local cache included within the business continuance appliance, wherein the local cache maintains the collected data. Furthermore, the remote backup site to be provided with the collected data, wherein the remote backup site maintains a secondary copy of the data located at the primary data storage. The summary log is utilized to minimize resynchronization time in the event of the combined failure of the business continuance appliance and the remote backup site.

DETAILED DESCRIPTION

The invention will be described primarily as a system and method for minimizing resynchronization time after backup system failures using a summary log, in an appliance-based business continuance architecture. In the following description, for purposes of explanation, numerous specific details are set forth in order to provide a thorough understanding of the present invention. It will be evident, however, to one skilled in the art that the present invention may be practiced without these specific details.

Those skilled in the art will recognize that an apparatus, such as a data processing system, including a CPU, memory, I/O, program storage, a connecting bus and other appropriate components could be programmed or otherwise designed to facilitate the practice of the invention. Such a system would include appropriate program means for executing the operations of the invention.

An article of manufacture, such as a pre-recorded disk or other similar computer program product for use with a data processing system, could include a storage medium and program means recorded thereon for directing the data processing system to facilitate the practice of the method of the invention. Such apparatus and articles of manufacture also fall within the spirit and scope of the invention.

Figure 1:
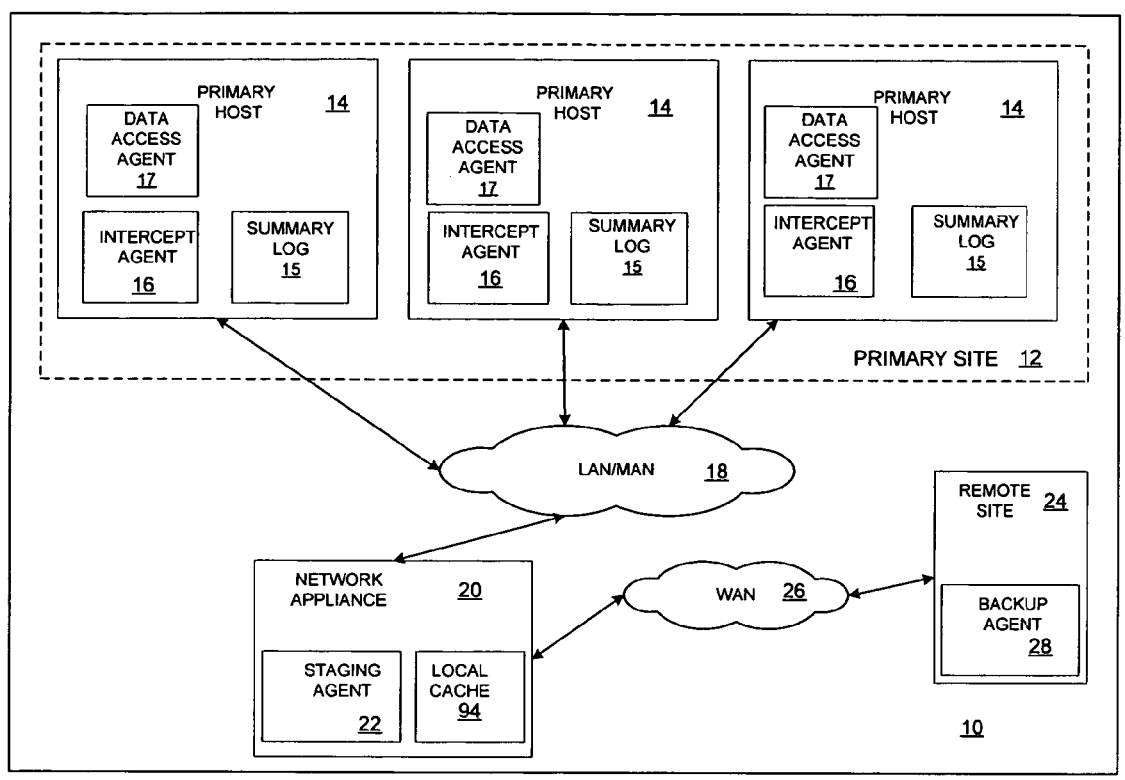
FIG. 1 shows an appliance-based business continuance architecture

FIG. 1 shows an appliance-based business continuance architecture 10. In this architecture, data is stored and accessed by applications running at primary site 12. Primary site 12 is comprised of one or more primary hosts 14, where primary hosts 14 serve all I/O requests made by the applications. Each primary host 14 includes an intercept agent 16. Intercept agent 16 collects statistics and patterns associated with all data requests (read and write) made by the applications. Moreover, intercept agent 16 collects identity and descriptive information associated with all data requests. Also, primary host 14 includes summary log 15 to maintain the statistics, patterns, identity and descriptive information collected by intercept agent 16. In addition, primary host 14 includes data access agent 17. Primary site 12 is connected to LAN/MAN 18.

Architecture 10 also includes network appliance 20. Network appliance 20 is connected to LAN/MAN 18. Network appliance 20 includes staging agent 22. Intercept agent 16 provides staging agent 22 with all of the collected statistics and access patterns. Moreover, intercept agent 16 provides staging agent 22 with all data requests and all data updates. Furthermore, network appliance 20 includes local cache 23.

Architecture 10 also includes remote site 24. In an exemplary embodiment, remote site is attached to network appliance 20 via WAN 26. Remote site 24 includes backup agent 28. Backup agent 28 is responsible for maintaining a secondary copy of the primary site data through analyzing and applying updates received via staging agent 22. In an alternative embodiment, backup agent 28 could be co-located with the staging agent at network appliance 20.

Intelligent Intercept Agent

In architecture 10, intercept agent 16 has two jobs: (1) to send updates to the staging agent 22; and (2) to trap I/O errors and redirect the requests to the staging agent 22 in a manner transparent to the requesting application. Intelligent intercept agent 100 includes all the functionality of intercept agent 16, with the additional ability to gathers access patterns and statistics information about the I/O that occurs on primary host 14. Statistics information includes what data is accessed (could be filenames or block addresses), who is reading or writing the data, how often the data is accessed or modified, when is the data accessed, etc. The contents of the read data are not forwarded to intelligent staging agent 102, such information need not be sent for every read operation. Instead, multiple records can be batched and piggybacked with updates that are sent for data replication. In an exemplary embodiment, a temporary in-memory buffer is allocated for batching. If there are no update requests for a long time, whenever the buffer is full, intelligent intercept agent 100 passes the recorded information to intelligent staging agent 102. Intelligent staging agent 102 also performs some statistical processing to reduce the amount of data to be sent to intelligent staging agent 102 whenever needed. Since intelligent staging agent 102 uses such information only for deciding which data is useful for caching and prefetching, a small delay in sending the statistics should not introduce significant impact.

In the preferred embodiment, intelligent intercept agent 100 is configurable by a system administrator as to what information it reports to intelligent staging agent 102. Further, intelligent intercept agent 100 can be configured so as to wait for the administrator to determine the exact nature of the failures before automatically redirecting requests to intelligent staging agent 102. Such configurations would vary depending on the needs of the organization utilizing architecture 92.

Intelligent Staging Agent

In architecture 10, staging agent 22 the following jobs: (1) Receiving updates from intercept agent 16 and adds them to an update log it maintains; (2) Sending updates asynchronously to backup agent 28; and (3) Servicing all I/O requests redirected to it by intercept agent 16, where such redirection is as a result of primary site 12 data unavailability (e.g., primary site 12 failure).

To minimize the performance degradation during the data unavailability at primary site 92, the concept of a "hot cache" maintained by intelligent staging agent 102 has been added. The "hot data" maintained by intelligent staging agent 102 is used whenever a primary host 14 at primary site 12 does not have the data available and intelligent staging agent 102 is contacted to retrieve the most up-to-date data copy. Intelligent staging agent 102 receives access patterns and statistics from intelligent intercept agent 100. Based on that information, intelligent staging agent 102 makes intelligent guesses about which data sets are likely to be needed in the near future. In the preferred embodiment, an interface to intelligent staging agent 102 is provided, where such interface can be utilized by a system administrator to instruct intelligent staging agent 102 to consider specified data-sets as hot. Many different criteria can be used to determine if a piece of data is hot or not. Next, the concept of "hot data" will be explained.

Hot Data

Various criteria is used in identifying a data as "hot." The following is a number of such criteria which can be utilized in making a determination as to the "hotness" of data files:

The more the file is used the more important it potentially is.

The greater the number of users using a particular file, the larger the set of users will be affected if the data is not available.

The time of access of a file can also determine its importance in some settings. For example if a file is normally accessed in the evening or on a weekend, it may be claimed to be less critical than the files that are accessed in the beginning of a workday.

Certain well-known executables and system files are important as they are necessary for the proper execution of the system.

System and user configuration files might be necessary for the users to login to their systems. These files, if they reside on the storage in question, can be considered "hot".

The administrator can also configure certain directories as important as they might belong to important applications that run on primary site 92.

Certain users' files (e.g. the CEO's mails) might be considered more important than others.

If a person is on leave then probably that user's files should not be considered hot for the duration of his/her leave. These and other such criteria based on real-world knowledge could be specified by an administrator if needed.

Smaller files may be given some preference during caching.

Meta-data information is normally very useful to keep in local cache 94 and can be considered hot. In fact, intelligent staging agent 102 can maintain a full copy of the meta-data locally for efficiency during data unavailability at primary site 92.

The content of files can also indicate the "hotness" of files.

The filename or its extension might indicate how important the file is. For example, foo.c is potentially more important that foo.o as the latter can be regenerated from the former. Well known filenames, like the system log files, can be assigned appropriate "hotness" as well.

The hotness of a data block can be dealt with in a similar fashion. Although there are no names for data blocks, but there could be some well-known data blocks that are of more importance. Similar to files, the data blocks that are used with a higher frequency by a large number of users or by some important users can be considered hot.

Cache Replacement

As part of caching data at local cache 94, intelligent staging agent 102 also decides on what cached data to replace when local cache 94 is full. Intelligent staging agent 102 can use a cache replacement policy based on access patterns. Popular schemes such as LRU and its successors, LFU, and ARC can be used under different situations. No particular algorithm is specified, because architecture 92 does not preclude any. The cache miss information and the cache replacement information can be used by intelligent backup agent 104 to perform intelligent data reorganization such that data accesses to remote site 24 is efficient. For instance, intelligent staging agent 102 can track replaced cache data-sets. Such information can be piggybacked to intelligent backup agent 104 whenever update data is replicated from intelligent staging agent 102 to remote site 24. Intelligent backup agent 104 can extract such information and perform appropriate optimizations.

Intelligent Backup Agent

Similar to backup agent 28 in architecture 10, intelligent backup agent 104 is responsible for replaying update requests to reconstruct secondary copies of data. In addition, intelligent backup agent 104 also analyzes the access patterns and statistics (e.g., cache miss ratio and replacement patterns) are sent by intelligent staging agent 102. Based on the analysis, it can perform optimizations, such as data reorganization, to improve I/O performance whenever intelligent backup agent 104 is asked to retrieve some data. One example of data reorganization is to duplicate the data that are accessed frequently, and store them in some sequential fashion. If primary site 92 fails, intelligent backup agent 104 applies all pending updates to the persistent storage, to give administrators the ability to create a copy of the latest data at remote site 24.

Data Access Agent

Data access agent 17 acts as a client to primary site 92 data. It can both read and write data to primary site 92 storage. It is used for two purposes. First, it is used by intelligent staging agent 102 to read data from primary site 92 that has been determined to be "hot", and for which it has been decided a second copy should be kept at local cache 94. Secondly, after a failure, when hardware issues have been resolved at primary site 92, intelligent staging agent 102 utilizes data access agent 17 to write the data that primary site 92 had missed during the time of its unavailability. The pending data are stored in intelligent staging agent 102 logs and flushed out through an interface provided by data access agent 17. Data access agent 17 can be located anywhere on primary site 92, where it has read/write access to primary site 92 data. Data access agent 17 is capable of restoring and accessing all primary site 92 data. In an alternative embodiment, data access agent 17 can be co-located with intelligent staging agent 102 at network appliance 20.

Automated Recovery

Intelligent staging agent 102 assists in bringing primary site 92 back up-to-date after a failure. Whenever intelligent intercept agent 100 fails to write to the primary site's storage, it informs intelligent staging agent 102 about the failure and the update request. Intelligent staging agent 102 keeps the updates in its log so that they can be replayed to primary site 92 once the primary site's failure has been repaired. Typically, the primary site 92 storage will first be recovered from some backup tapes. Then all the updates that are issued after that backup time must be applied to bring the primary storage fully up to date. One way to do this is to create a latest tape backup at remote site 24 after the failure, and use that tape for the primary storage restoration. Once restored, the primary storage is only missing a subset of the data, which is located in the log of intelligent staging agent 102. Intelligent staging agent 102, when instructed by a system administrator, can replay these updates to primary site 92 by using data access agent 17. When primary site 92 has been brought up-to-date, intercept agent 100 is informed and normal operation of primary site 92 is resumed.

The invention facilitates a more efficient recovery from backup system component failures in architecture 10. The recovery is made more efficient through minimizing resynchronization times for network appliance 20 and/or remote site 24.

Summary log 15 at primary host 14 is utilized to maintain a set of changes made to data stored at primary host 14, since some past point in time. Bounded memory and bounded disk space are utilized for the summary log. Although summary log 15 does not contain the content of the changes themselves, it can be used to infer the data to be recovered in case network appliance 20 or and/or remote site 24 fail.

Figure 2:
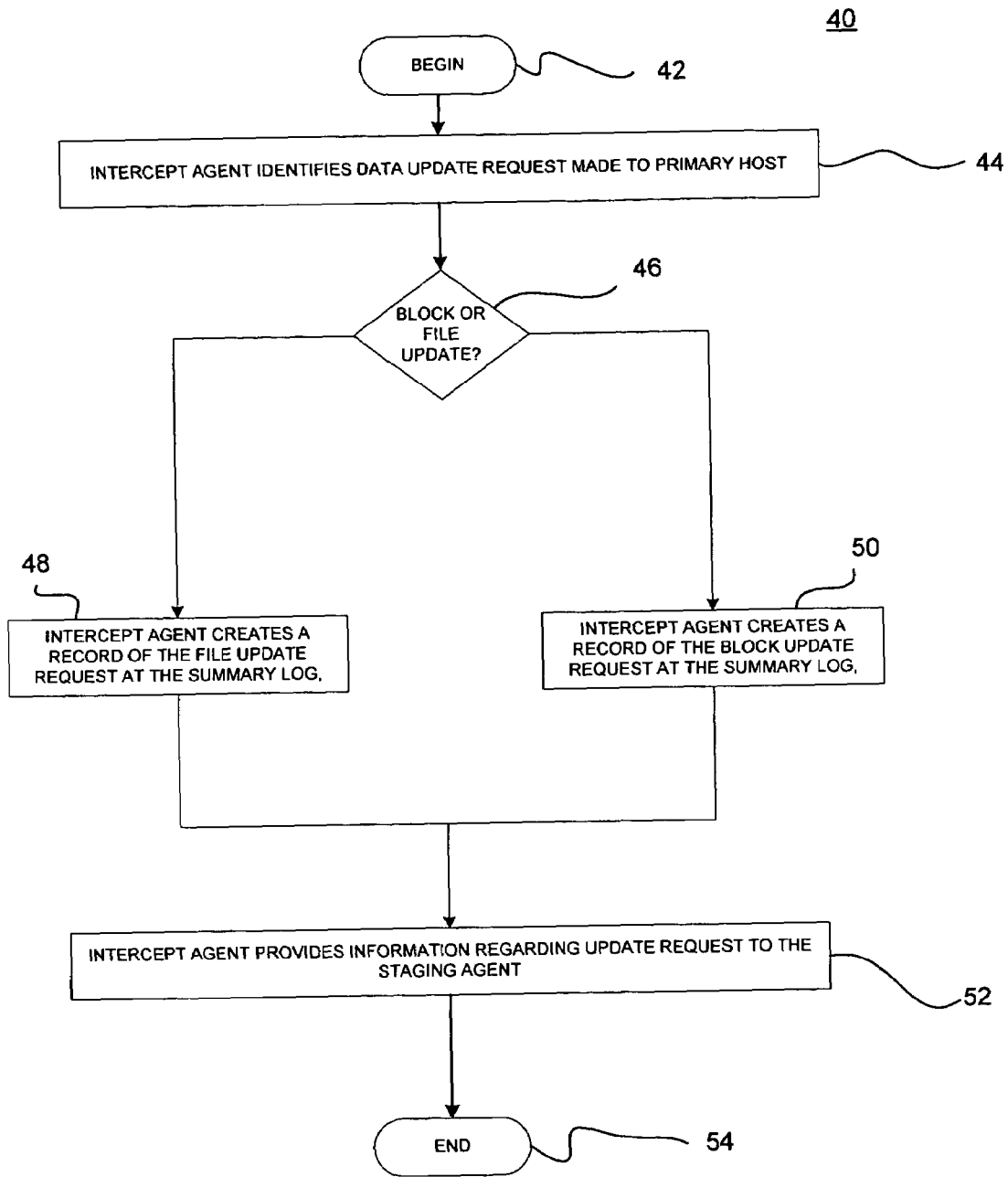
FIG. 2 illustrates a method, of writing to a summary log

FIG. 2 illustrates a method 40, of writing to summary log 15. At block 42, method 40 begins.

At block 44, intercept agent 16 identifies a data update request made to primary host 14, and collects information associated with the data update request.

At block 46, a determination as to whether the data to be updated is a block or file is made. If a file, then at block 48, a record of the file update is created is created by intercept agent 16 in summary log 15. If a block, then at block 50, a record of the block update is created by intercept agent 16 in summary log 15.

At block 52, intercept agent 16 provides the information collected at block 44 to staging agent 22.

At block 54, method 40 ends.

The summary log record contains the logical update request, but not the modified data content. For instance, for a write request to a file region, the record can be simply the file name, the file offset, and the length of the updated file region. For a disk block update, it could be disk ID, disk address, and the number of disk blocks that are updated.

To avoid any significant cost to primary host 14, the size of summary log 15 should be maintained as a relatively small value, for instance, a few tens of megabytes of memory, and a few gigabytes of disk space. When backup system components fail, summary log 15 can be used to determine which data has been updated and needs to be resynchronized between the primary host 14 and remote site 24. The summary log 15 always provides a correct superset of the data that needs to be resynchronized. The amount of superfluous resynchronization is kept to a minimum even in cases when the amount of updates is very large. The invention disclosed provides the most benefit when the amount of changes that must be resynchronized is significantly smaller than a full dataset. In practice, this is almost always the case.

Figure 3:
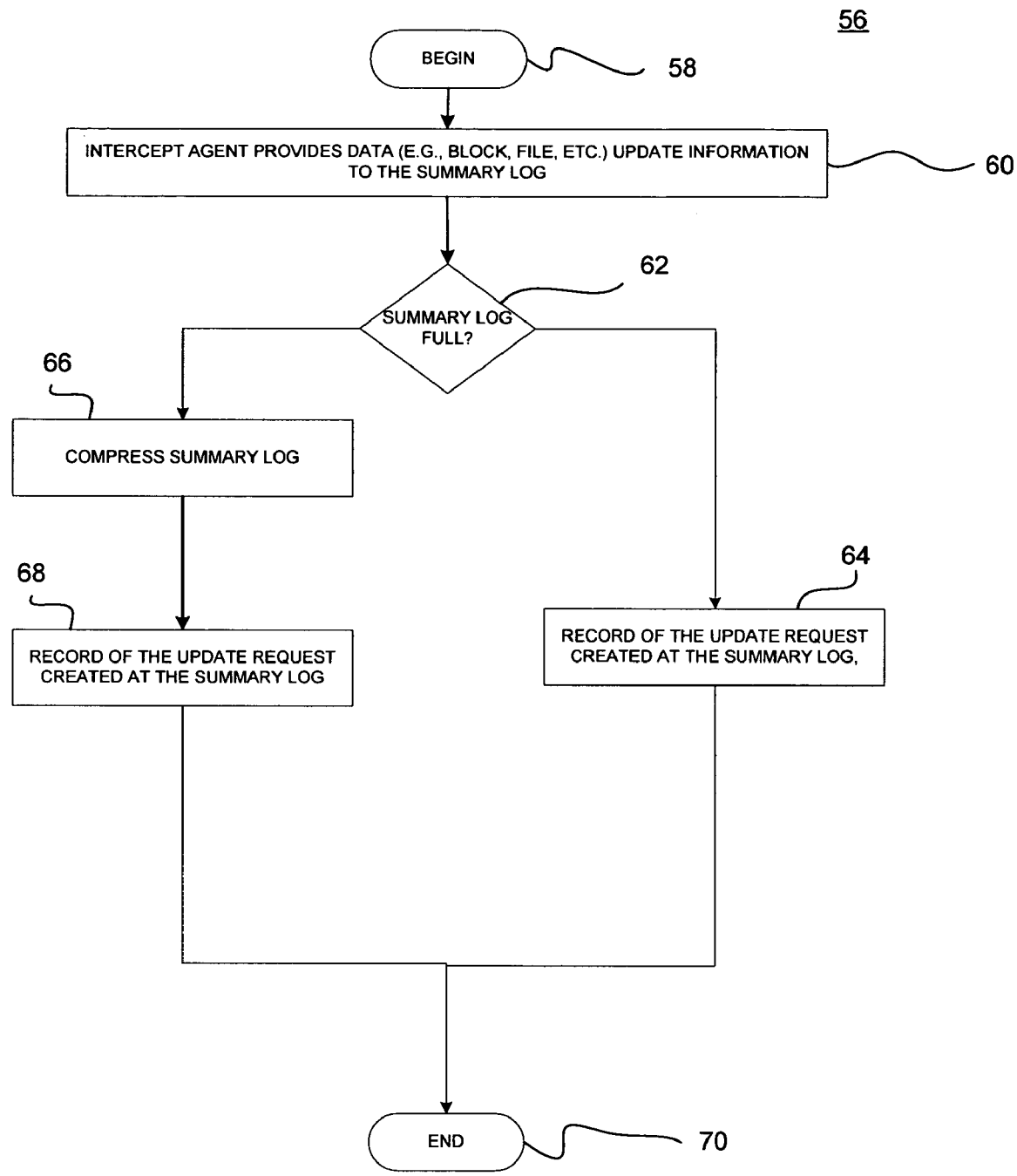
FIG. 3 illustrates a method, of compressing a summary log

FIG. 3 illustrates a method 56, of compressing summary log 15. At block 58, method 56 begins.

At block 60, intercept agent 16 provides data update information to summary log 15. Normally, when there is free space in summary log 15, precise change information can be recorded. When such information is used during resynchronization, the resynchronization time is considered to be optimal, as the system knows exactly what data needs to be recovered.

At block 62, a determination is made as to whether summary log 15 has reached its capacity. If no, then at block 64, a record of the update request is made at summary log 15.

Returning to block 62. If yes, then at block 66, depending on the types of data being replicated (e.g., files or disk blocks), data type-specific information is utilized to create "summaries" of changes to the data, instead of keeping exact change information at all times. Here, the process of creating summaries is called compression. Such summaries may be less precise in terms of what data has been changed, but the information is sufficient for one to resynchronize data. To ensure that the resynchronization time is still kept close to optimal even when compression is done, a set of compression algorithms is included, as well as strategies on how to select appropriate compression algorithms under different system conditions.

At block 70, method 56 ends.

In general, the larger the allocated size of summary log 15, the more precise are the changed information stored therein. Thus, a larger bound on summary log 15 will result in a smaller resynchronization time than with a smaller bound. Overall, the invention imposes very little performance and resource overhead on primary host 14 both for the normal system runtime and during the component failure and recovery modes. It is adaptive to a wide range of failure conditions with close to optimal data resynchronization time for the given system resources.

To recover from an appliance failure, as long as the summary log contains the records that correspond to all the updates in the persistent log in the appliance, one can recover from the appliance failure by simply reading the most up-to-date data copy based on the summary log from the primary host site and sending them to the newly installed appliance. This implies that the summary log needs not keep all update records indefinitely. It only needs to keep very limited change history for the resynchronization to work well. Furthermore, since the summary log resides on the primary host, it is important that the summary log is kept small and bounded to avoid overuse of the primary host's resources.

Figure 4:
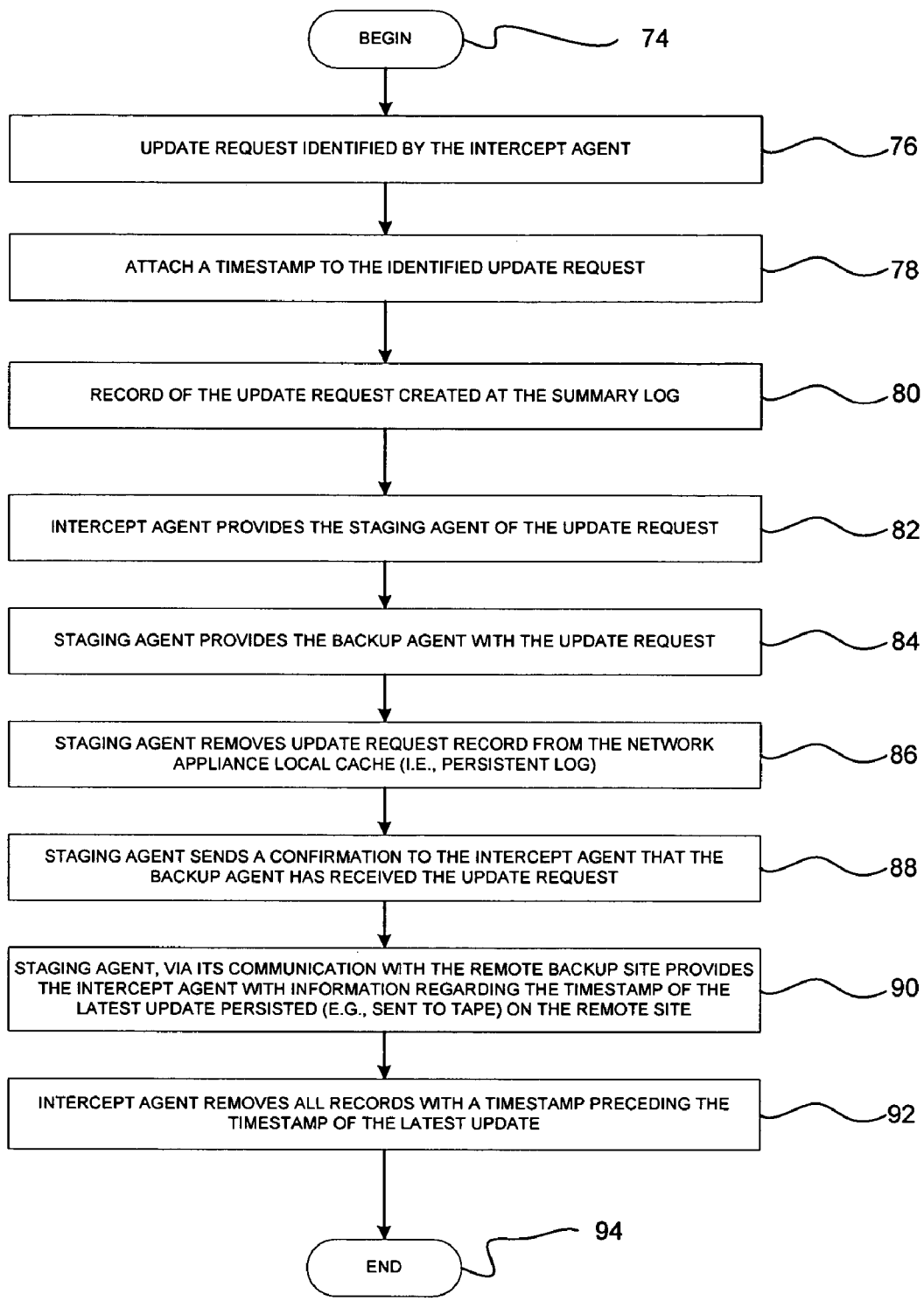
FIG. 4 illustrates a method, for maintaining a summary log

FIG. 4 illustrates a method 72, for maintaining summary log 15. Summary log 15 can be kept bounded through the removal of update records when staging agent 22 sends a confirmation that remote site 24 has received copies of the update records. Since backup agent 28 has already received the update records, the corresponding records in the staging agent's persistent log can also be removed. At block 74, method 72 begins.

At block 76, an update request received at primary host 14 is identified.

At block 78, a timestamp is attached to the identified update request. The timestamp is attached to facilitate identifying which records can be removed from summary log 15.

At block 80, a record of the identified update request is created at summary log 15.

At block 82, intercept agent 16 provides staging agent 22 with a record of the update request. Staging agent 22 will handles all requests from intercept agent 16 in temporal order. Hence, whenever a set of requests have been persisted on remote site 24, staging agent 22 can inform intercept agent 16 about the timestamp of the latest update that has been persisted on remote site 24. Intercept agent 16 then removes all records that have a smaller or equal timestamp from summary log 15, reducing the size of summary log 15.

At block 84, staging agent 22 provides backup agent 28 with a record of the identified update request received from intercept agent 16.

At block 86, staging agent 22, through its communication with remote site 24, via backup agent 28, provides intercept agent 16 with information regarding the timestamp of the latest update request persisted (e.g., sent to tape, disk, etc.) at remote site 24.

At block 88, intercept agent 16 removes all records with a timestamp preceding the timestamp of the latest update.

At block 90, method 72 ends.

Method 72 does not cover the case when the summary log 15 grows beyond the desired size because of a large number of updates that have not been persisted on remote site 24. In this case the persistent log on staging agent 22 would also be correspondingly large. This may happen in multiple scenarios. For instance, WAN 26 between remote site 24 and network appliance 20 may be too slow or disconnected, or the remote site's request handling may be too slow resulting in updates being accumulated in the persistent log at network appliance 20. This could also happen if there is an unusually high rate of updates on primary site 14. To deal with such situations, an algorithm is provided to compress multiple change descriptions into a high level summary of the changes in such a way that summary log 15 never grows out of bound. Such compression strategies do not lose information about any updates that must be applied during the failure recovery, but it may result in longer-than-optimal resynchronization times. The algorithm works in such a way that it always tries to minimize the extra resynchronization time due to such compression. The types of available compression algorithms that can be utilized to maintain a bounded summary log size while still optimizing for minimal resynchronization times are further explained below.

Figure 5:
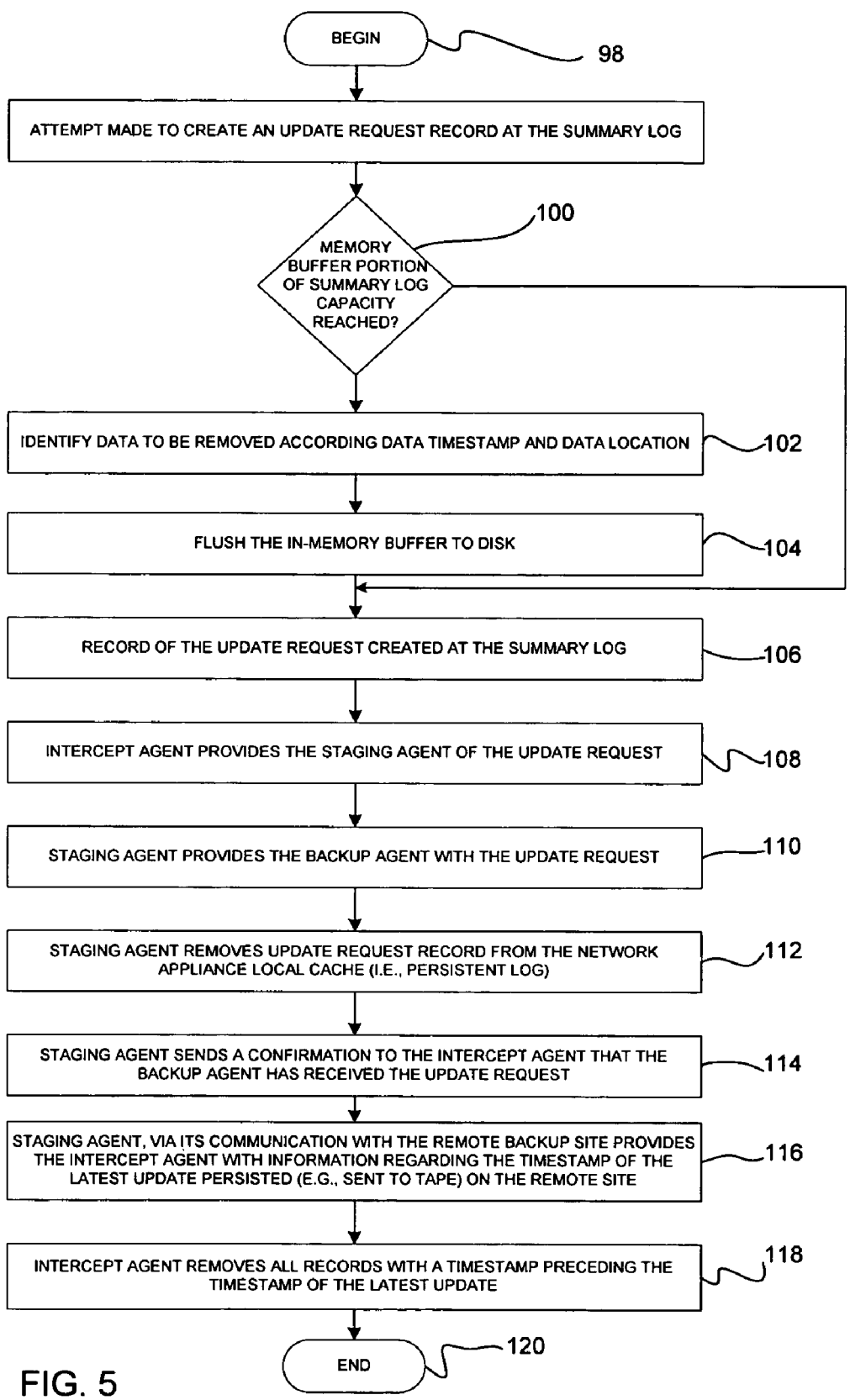
FIG. 5 illustrates a method of compressing a summary log in response to the summary log reaching its capacity

FIG. 5 illustrates a method 92 of compressing summary log in response to summary log 15 reaching its capacity.

At block 94, method 92 begins.

At block 96, a data update request to primary host 14 is identified.

At block 98, a determination is made as to whether summary log 15 memory buffer portion has reached capacity. If yes, then at block 100, utilizing a compression algorithm, data within the memory buffer portion is identified for compression. At block 102, the data identified at block 100 is compressed.

At block 104, a record of the identified update request is created at summary log 15.

At block 106, intercept agent 16 provides staging agent 22 with a record of the update request. Staging agent 22 will handles all requests from intercept agent 16 in temporal order. Hence, whenever a set of requests have been persisted on remote site 24, staging agent 22 can inform intercept agent 16 about the timestamp of the latest update that has been persisted on remote site 24. Intercept agent 16 then removes all records that have a smaller or equal timestamp from summary log 15, reducing the size of summary log 15.

At block 108, staging agent 22 provides backup agent 28 with a record of the identified update request received from intercept agent 16.

At block 110, staging agent 22, through its communication with remote site 24, via backup agent 28, provides intercept agent 16 with information regarding the timestamp of the latest update request persisted (e.g., sent to tape, disk, etc.) at remote site 24.

At block 112, intercept agent 16 removes all records with a timestamp preceding the timestamp of the latest update.

At block 114, method 92 ends.

To handle remote backup site failures and concurrent remote backup and the appliance failures, a slight modification to the above approach can be used.

When remote site 24 fails, it is assumed that it can be restored to the last tape backup first. The remaining data that must be recovered from primary host site 14 is the difference between the primary data copy and the last tape backup. This should not be very costly in terms of network resources as normally only a fraction of the overall dataset would need to be resynchronized over the long distance network. To facilitate such an efficient recovery, summary log 15 must contain the summary records for all the updates that had happened since that tape backup at remote site 24. This can be done by letting the backup agent 28 send some information to staging agent 22 whenever it starts a tape backup. Staging agent 22 in turn forwards the information to intercept agent 16. The information indicates the timestamp of the last persisted update request when the tape backup was started. At this time, all records that have smaller or equal timestamp can be removed from summary log 15. Thus, summary log 15 contains a superset of the summary records needed for the recovery from failures of staging agent 22. Even if both network appliance 20 and remote site 24 fail at the same time, summary log 15 can be used to identify the data sets that need to be resynchronized thus reducing the recovery costs significantly.

Staging agent 22 can still let intercept agent 16 know the timestamp of the latest update that was persisted at remote site 24 from time to time. If network appliance 20 failed, intercept agent 16 does not have to process all summary log records. Instead, it only needs to resynchronize all records that have larger timestamps than the last timestamp sent by staging agent 22. This way, the same summary log 15 can be used to recover both network appliance 20 and remote site 20 failures efficiently. In general, it is possible for intercept agent 16 to keep more change records than needed indefinitely as long as there is spare space in summary log 15, and there is an easy way for intercept agent 16 to figure out what records need to be used for a given failure case. For example, if there is enough log space to keep the change descriptions since the last N tape backups, then the system can recover data even if N-1 tape backups were unavailable without doing an exhaustive scan and comparison between the primary and the backup data copies.

Since part of summary log 15 is the main memory of primary host 14, if primary host 14 crashes, a portion of summary log 15 may be lost after primary host 14 restarts. This may not be a significant problem since the records in summary log 15 are typically kept only for a certain period of time and used only when there is a failure in the backup system components. If there is no such a failure during that period of time, there is no need for the old summary log records. If it is desirable to keep summary log 15 information even in the face of primary host 14 failures, staging agent 22 can mirror summary log 15 on its own persistent storage. This way, if primary host 14 crashed, it can quickly reload summary log 15 by contacting staging agent 22. Creating a copy of summary log 15 by staging agent 22 is not expensive, since it can be done as the persistent log is written, or as a background process that processes the persistent log.

Compression Algorithm for a Bounded Summary Log

Summary log 15 compression is accomplished by summarizing a large number of the data update records within summary log 15 into a small number of higher level summary records to reduce the storage space requirement in summary log 15. The compression may increase the resynchronization time but it works in such a way that resynchronization times is kept as close to optimal as possible. Compression is only triggered when summary log 15 reaches capacity. As long as summary log 15 is reasonably large, in normal cases, compression will not be triggered.

Here, the exemplary compression algorithm is developed based on a combination of locality (temporal and spatial) and summarization of records.

Data accesses typically exhibit some temporal and spatial locality. For instance, common uses of filesystems exhibit locality of updates in the filesystem hierarchy. Thus, in any small period of time, from a few hours to a few days, the number of distinct directories under which updates have been made is typically low compared to the total number of directories. Similarly, the block device accesses will also see some level of data locality, although the locality may be less obvious than in file systems.

When summary log 15 reaches capacity, any number of updates in a data set can be summarized by packing a large number of change descriptions into a small number of records without losing any change information. For instance, a set of updates in a file system hierarchy can be summarized by picking a small number of ancestors that cover all the files and directories that were updated. During resynchronization, only those subtrees need to be resynchronized. Since the subtrees are significantly smaller than the entire file system, a comparison or even a data copy for resynchronization will be fast. Similarly for block device accesses, updated block numbers can be aggregated in inclusive ranges.

Note that such compression may result in loss of accuracy in the change descriptions, even though no changes will be lost due to compression. Furthermore, if appropriate compression strategies are selected, the change description accuracy will still be high, hence the resynchronization time will not deviate significantly from the optimal time.

To facilitate efficient and effective compression of summary log 15, appropriate summary log 15 data structures have been devised to track data update description records, so that compression can be done efficiently with minimal effect on primary host 14 data processing. Also, a set of compression strategies that determine how to compress data under different situations are included. Selection of appropriate compression strategies are based on system conditions. Below, file system data is used as an example to show how these issues are addressed. As explained below, these techniques can be extended or modified to support disk block data as well.

The Data Structure

As described earlier, summary log 15 contains a memory buffer and some disk space. For ease of discussion, assume that the disk portion of the summary log is always a multiple of the memory buffer in size. The memory buffer contains the latest change descriptions. Intercept agent 16 always updates the in-memory buffer first. If there isn't any space left in memory, summary log 15 in-memory buffer is flushed to disk. If the in-memory buffer is allocated out of a contiguous memory region, a big sequential write is needed to write it to disk. Each of these in-memory buffers is known as a chunk of summary log 15. To facilitate fast compression for file system data, a data structure that can represent a hierarchy of nodes efficiently is used. Each node corresponds to a directory or a file. Conceptually, whenever an update is reported, the nodes representing the path are created in the data structure if not already present, thus recording the update to the filesystem. Such operation in memory will not be expensive, since it is mostly a tree lookup and update. If an existing node already covers the update, the data structure is not changed. For example, if a directory node already indicates that its children are potentially updated and another update associated with the children is received, then nothing is done, as that child is already identified as being updated.

The following data structure representation is utilized in the preferred embodiment:

File Node—This node contains the name or regular expression representing the file or files it represents. A flag can be used to indicate if the update is on the file metadata or file content. For file content, it can contain file regions that have been updated in terms of file offset and length of the updated region, and the total size of the file;

Directory Node—This node contains the name or regular expression representing the directory or directories it represents. It has a field called Depth which indicates the maximum depth of an update in the filesystem subtree rooted at this directory. Thus, if a file got renamed and placed into this directory, the Depth would be 0, as only the directory listing is updated. If a file is created under a directory then the Depth would be 1, because apart from the directory listing, the files one level below have been updated. A Depth of −1, means that this node was not updated, but it is an ancestor of a node that was updated. Thus, such a node merely helps in specifying the path to nodes that were updated. On the other hand a Depth of "infinity" (here, −2 is used) means that the entire subtree under this directory is potentially updated and hence the backup may need to resynchronize the entire subtree in the event of backup system component failures. A flag can also be used to indicate if the directory update is on the metadata or directory content.

To facilitate fast summary log 15 record removal, the timestamp of the last update recorded is tracked in each chunk so that whenever intercept agent 16 receives timestamp information from staging agent 22 regarding records to be removed, it can simply check the recorded last timestamp for that chunk. If that timestamp is smaller than the one received from staging agent 22, all records in that chunk can be removed. If the chunks are stored in local files, then the file can be removed. Once summary log 15 reaches close to the allocated space, it can be compressed by starting from the oldest chunks, and compressing the oldest N chunks by applying one or more of the various compression strategies discussed below. N is a configurable parameter. Once compressed, some summary log 15 space will be freed up. The same process is repeated until the amount of freed space reaches some predetermined threshold. The compression still maintains the timestamp information so that even after merge, the chunks can be removed as needed. The oldest chunks are compressed first, because the old records are removed first when the data is persisted or backed up at remote site 24.

Compression Strategies

To bound summary log 15 size, a set of compression strategies are defined. The strategies act on one or more given chunks and trim them so that some designated amount of space can be freed up in summary log 15. The strategies include:

Extent Compression—Whenever a file region is updated the file offset and length of the updates is added appropriately to the file node. These file region records can be merged to release some space. The records that have the least difference between the end of the first file region and the start of the second region are merged. All file regions can also be removed, to imply that the entire file has been updated.

Name Compression—Names of Files and Directories can be compressed by using some form of regular expressions. For example, "foolongname" can be represented as "fo*".

Sibling Compression—The name compression strategy can also be used on sibling files or directories to reduce the number of nodes. When multiple directory nodes are thus merged, the maximum depth value among the siblings is used for the new node.

Depth Increase—The depth value of a directory can be increased to free up all nodes that would be covered by the new value of the depth.

Strategies such as name compression, depth increase and extent compression can be applied to individual nodes, and sibling compression to a group of nodes. Clearly, in the worst case, the result of compression may be simply one node in the tree, i.e., the node that represents the root of the file system. That would mean that that no specific information regarding filesystem updates was available, and as a result, resynchronization time may be quite large. This shows that our algorithm is indeed bounded if summary log 15 is at least as big as the space needed to hold the root node (a few bytes). In practice given the data locality, this is unlikely.

Picking the Right Strategy

To free space in summary log 15, the right set of strategies need to be applied to the right set of nodes in a manner that will increase the resynchronization time by the least amount but release the amount of the space desired. Let the amount of desired space to be release be M, the number of nodes in the hierarchy be N, and the number of different strategies being considered be S. For each node in the hierarchy and each strategy that can be applied to the node, $\Delta m_{i,j}$ is computed, which is the amount of space released by the application of the strategy j on the node i. $\Delta t_{i,j}$ can also be computed and is the amount of resynchronization time increased by the application of the strategy j on the node i. Thus, the problem can be formalized as below:

$$\text{minimize} \sum_{1 \le i \le N; 1 \le j \le s} \Delta t_{i,j} \cdot x_{i,j}$$

$$\text{subject to} \sum_{1 \le i \le N; 1 \le j \le s} \Delta m_{i,j} \cdot x_{i,j} >= M$$

$$x_{i,j} \varepsilon \{0, 1\}; i = 1, 2, \ldots, N; j = 1, 2, \ldots, S$$

The above problem formulation states that a set of (node, strategy) tuples have to be chosen, such that the total resynchronization time increase is minimized and the memory released is greater or equal to M. This is the minimization variant of the 0-1 Knapsack Problem. Although this problem is known to be NPhard, there are well known techniques to solve this problem like the branch-and-bound technique, dynamic programming technique, state-space relaxation and preprocessing. The well known polynomial time algorithms that produce almost optimal solutions very quickly can also be used. The simplest suboptimal solution would be to map the problem to the continuous knapsack problem and solve using the greedy algorithm to arrive at an almost optimal solution in most cases. Greedy algorithms work well with bounded space.

Depending on the memory allocation algorithm used by the data structure, $\Delta m_{i,j}$ should not be difficult to compute. Computing $\Delta t_{i,j}$ accurately would need more information than what is stored in the data structure. In case of extent compression, $\Delta t_{i,j}$ can be estimated if the total size of the file is known and an estimate of the time it takes to resynchronize is available N bytes of file data. When depth is increased for a directory node, it is helpful to know how much resynchronization time would increase. This would require an estimate as to how much extra data may have to be resynchronized. This often means that file and directory size information is needed. One way to obtain this information, is to access metadata for the files and directories under the node being compressed. Another way is to gather the metadata information from remote site 24 to avoid an impact on primary host 14 performance. The information at remote site 24 may be less accurate than the information at primary host 14, since some requests may not have been synchronized from staging agent 22 to remote site 24. However, since only estimates are needed, this approach is reasonable. Such information gathering can be done as a continuous background process or when the compression is needed. If it is done when the compression is needed, primary host 14 processing may be affected for a short while. However, since compression is rare, this is not a significant drawback. Alternatively, by giving up on the close-to-optimal nature of the resynchronization time, it is also possible not to gather metadata information at all. Rather, some rule-of-thumb "guesses" can be used to provide estimates on the resynchronization times. For example, a reasonable average size for directories and for files can be assumed to estimate resynchronization times.

For disk blocks, the compression can be accomplished in a manner similar to the extent compression described above. Fixed sized disk blocks are worked on instead of file extents. In the worst case, the compression would result in a single disk partition. The data structure used to track such disk block change records can be a combination of diskID, disk block address, and the number of changed blocks starting from that disk address.

Resynchronization After the Backup System Failures Using the Summary Log

Once summary log 15 is formed, resynchronization is straight-forward. If summary log 15 records describe the exact change information, the system can simply read the data based on the change description from primary host 14, and apply it to the out-of-date backup copy. For the compressed records, there are two possibilities:

(1). It is possible for the system to simply read whatever is indicated by summary log 15 records. This would mean that some superset of changes may be read and written to the backup copy. If the amount of extra data read is not a significant amount, this is not a problem; and (2). On the other hand, if the summarized information could introduce significant addition to the amount of data to be resynchronized, it is possible to perform a comparison on the data described by records in summary log 15 before data is resynchronized. Only the data that are different needs to be written to the backup copy (e.g., at remote site 24). Since such a comparison is not done on the entire data set, the comparison can be done reasonably quick. Although, in practice, such comparison is avoided.

This can be accomplished in many ways, such as through synchronizing the remote backup copy with the primary and starting off with a clean persistent log, or recreating a logically equivalent persistent log at network appliance 20 by reading summary log 15 and obtaining a set of changes that are potentially superset of the real changes.

Thus, a system and method for minimizing resynchronization time after backup system failures using a summary log, in an appliance-based business continuance architecture. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system for minimizing data resynchronization time after backup system component failures in an appliance-based business continuance architecture, comprising:
   at least one primary data storage;
   at least one primary host machine, wherein the primary host machine can access data stored at the primary data storage;
   an intercept agent at the at least one primary host machine to intercept data requests and collect information regarding the intercepted data requests;
   a summary log at the at least one primary host machine to maintain the collected information;

at least one business continuance appliance in communication with the intercept agent and in communication with a remote backup site, wherein the business continuance appliance receives the collected information from the intercept agent;

a local cache included within the business continuance appliance, wherein the local cache maintains the collected data; and the remote backup site to be provided with the collected data, wherein the remote backup site maintains a secondary copy of the data located at the primary data storage, whereby, the summary log is utilized to minimize resynchronization time in the event of the combined failure of the business continuance appliance and the remote backup site, wherein the configurable period of time is based on whether the data has been backed up to persistent storage by the remote backup site and further wherein the including of a timestamp on the collected information by the intercept agent is utilized to identify which information has been moved to persistent storage at the remote backup site.

2. The system of claim 1 wherein the collected information includes identity and descriptive information associated with updates to the primary data storage.

3. The system of claim 1 wherein the collected information is maintained by the summary log for a configurable period of time.

4. The system of claim 1 wherein the configurable period of time is based on whether the data has been backed up to persistent storage by the remote backup site.

5. The system of claim 1 wherein the remote backup site upon moving data to persistent storage provides the persisted data's timestamp to the intercept agent, wherein the intercept agent removes all data from the summary log which has the equivalent or earlier timestamp.

6. The system of claim 1 wherein the persistent storage comprises tape backup.

7. A system for minimizing data resynchronization time after backup system component failures in an appliance-based business continuance architecture, comprising:

at least one primary data storage;

at least one primary host machine, wherein the primary host machine can access data stored at the primary data storage;

an intercept agent at the at least one primary host machine to intercept data requests and collect information regarding the intercepted data requests;

a summary log at the at least one primary host machine to maintain the collected information;

at least one business continuance appliance in communication with the intercept agent and in communication with a remote backup site, wherein the business continuance appliance receives the collected information from the intercept agent;

a local cache included within the business continuance appliance, wherein the local cache maintains the collected data; and the remote backup site to be provided with the collected data, wherein the remote backup site maintains a secondary copy of the data located at the primary data storage, whereby, the summary log is utilized to minimize resynchronization time in the event of the combined failure of the business continuance appliance and the remote backup site, wherein the summary log is maintained by compressing the summary log contents upon the summary log reaching its capacity.

8. The system of claim 7 wherein compressing comprises reducing the amount of collected information associated with each data request so that only a summary of the collected information associated with each data request is maintained.

9. The system of claim 8 wherein the decision as to which information to summarize comprises identifying the collected information within the summary log which is the oldest and summarizing the collected information from the oldest to the most recent collected information until there is adequate room in the summary log to begin storing the collected information.

10. The system of claim 9 further comprises identifying multiple update requests which are within an identifiable group and replacing the collected information associated with each of the multiple update requests with a single record of information describing the update to the identifiable group.

11. The system of claim 10 wherein the identifiable group comprises a file.

12. The system of claim 10 wherein the identifiable group comprises blocks of contiguous data.

13. An article of manufacture for minimizing data resynchronization time after backup system component failures in an appliance-based business continuance architecture, comprising:

at least one primary data storage; and at least one primary host machine including the primary data storage and a summary log, wherein the summary log maintains collected information associated with data requests made to the primary host machine, wherein the summary log is maintained by compressing the summary log contents upon the summary log reaching its capacity.

14. The article of manufacture of claim 13 further includes an intercept agent at the at least one primary host machine to collect the information associated with the data requests.

15. The article of manufacture of claim 14 wherein the intercept agent is in communication with a business continuance appliance, wherein the intercept agent forwards a copy of the collected information to the business continuance appliance.

16. The article of manufacture of claim 15 wherein the business continuance appliance stores the collected information in a local cache.

17. The article of manufacture of claim 16 wherein the business continuance appliance provides the collected information to a remote backup site, wherein the remote backup site maintains a secondary copy of the data located at the primary data storage.

18. The article of manufacture of claim 13 wherein the summary log is utilized to minimize resynchronization time in the event a failure in the appliance-based business continuance architecture remote backup system.

19. The article of manufacture of claim 13 wherein the collected information includes identity and descriptive information associated with updates to the primary data storage.

20. The article of manufacture of claim 13 wherein the collected information includes: a description of the data request, including the type of the data request, wherein the type consists of read requests and write requests; data associated with the data requests, when the data request is a write request; and access patterns and statistics associated with the data requests, wherein the access patterns and statistics are collected at the primary host.

21. An article of manufacture for minimizing data resynchronization time after backup system component failures in an appliance-based business continuance architecture, comprising:
  at least one primary data storage; and
  at least one primary host machine including the primary data storage and a summary log, wherein the summary log maintains collected information associated with data requests made to the primary host machine, wherein the collected information is maintained by the summary log for a configurable period of time and further wherein the configurable period of time is based on whether the data has been backed up to persistent storage by the remote backup site.

22. The article of manufacture of claim 21 wherein the including of a timestamp on the collected information by the intercept agent is utilized to identify which information has been moved to persistent storage at the remote backup site.

23. The article of manufacture of claim 22 wherein the remote backup site upon moving data to persistent storage provides the persisted data's timestamp to the intercept agent, wherein the intercept agent removes all data from the summary log which has the equivalent or earlier timestamp.

24. The article of manufacture of claim 23 wherein the persistent storage comprises tape backup.

25. The article of manufacture of claim 13 wherein compressing comprises reducing the amount of collected information associated with each data request so that only a summary of the collected information associated with each data request is maintained.

26. The article of manufacture of claim 25 wherein the decision as to which information to summarize comprises identifying the collected information within the summary log which is the oldest and summarizing the collected information from the oldest to the most recent collected information until there is adequate room in the summary log to begin storing the collected information.

27. The article of manufacture of claim 26 further comprises identifying multiple update requests which are within an identifiable group and replacing the collected information associated with each of the multiple update requests with a single record of information describing the update to the identifiable group.

28. The article of manufacture of claim 27 wherein the identifiable group comprises a file.

29. The article of manufacture of claim 27 wherein the identifiable group comprises blocks of contiguous data.

30. A method of minimizing data resynchronization time after backup system component failures in an appliance-based business continuance architecture, comprising:
  intercepting data requests made to a primary host machine;
  collecting information associated with the intercepted data requests;
  storing the collected information at a summary log, wherein
    the summary log is located at the primary host machine providing the collected information to a business continuance appliance, wherein
    the business continuance appliance provides a copy of the collected information to a remote backup site, wherein
    the remote backup site maintains a secondary copy of the data located at the primary data storage, whereby,
    the summary log is utilized to minimize resynchronization time in the event of the combined failure of the business continuance appliance and the remote backup site, wherein a configurable period of time during which information is maintained by the log is based on whether the data has been backed up to persistent storage at the remote backup site.

31. The method of claim 30 wherein the collected information includes identity and descriptive information associated with the data requests.

32. The method of claim 30 wherein the collected information is maintained by the summary log for a configurable period of time.

33. The method of claim 32 wherein including a timestamp on the collected information is used to identify which information has been moved to persistent storage at the remote backup site.

34. The method of claim 33 wherein the remote backup site upon moving data to persistent storage provides the persisted data's timestamp to the primary host, wherein all data in the summary log which has the equivalent or earlier timestamp is removed.

35. The method of claim 32 wherein the persistent storage comprises tape backup.

36. A method of minimizing data resynchronization time after backup system component failures in an appliance-based business continuance architecture, comprising:
  intercepting data requests made to a primary host machine;
  collecting information associated with the intercepted data requests;
  storing the collected information at a summary log, wherein
    the summary log is located at the primary host machine providing the collected information to a business continuance appliance, wherein
    the business continuance appliance provides a copy of the collected information to a remote backup site, wherein
    the remote backup site maintains a secondary copy of the data located at the primary data storage, whereby,
    the summary log is utilized to minimize resynchronization time in the event of the combined failure of the business continuance appliance and the remote backup site, wherein the summary log is maintained by compressing the summary log contents upon the summary log reaching its capacity.

37. The method of claim 36 wherein compressing comprises reducing the amount of collected information associated with each data request so that only a summary of the collected information associated with each data request is maintained.

38. The method of claim 37 wherein the decision as to which information to summarize comprises identifying the collected information within the summary log which is the oldest and summarizing the collected information from the oldest to the most recent collected information until there is adequate room in the summary log to begin storing the collected information.

39. The method of claim 38 further comprises identifying multiple update requests which are within an identifiable group and replacing the collected information associated with each of the multiple update requests with a single record of information describing the update to the identifiable group.

40. The method of claim 39 wherein the identifiable group comprises a file.

41. The method of claim 39 wherein the identifiable group comprises blocks of contiguous data.

42. A method for deploying an appliance-based business continuance system in which data resynchronization time is minimized after backup system component failure, comprising:
  integrating computer-readable code into the system, wherein the code in combination with the system is capable of:
    intercepting data requests made to a primary host machine;
    collecting information associated with the intercepted data requests;
    storing the collected information at a summary log, wherein
  the summary log is located at the primary host machine providing the collected information to a business continuance appliance, wherein
  the business continuance appliance provides a copy of the collected information to a remote backup site, wherein
  the remote backup site maintains a secondary copy of the data located at the primary date storage, whereby,
  the summary log is utilized to minimize resynchronization time in the event of the combined failure of the business continuance appliance and the remote backup site, wherein a configurable period of time during which collected information is maintained by the summary log is based on whether the data has been backed up to persistent storage at the remote backup site.

43. The method of claim 42 wherein the collected information includes identity and descriptive information associated with the data requests.

44. The method of claim 42 wherein the collected information is maintained by the summary log for a configurable period of time.

45. The method of claim 44 wherein including a timestamp on the collected information is used to identify which information has been moved to persistent storage at the remote backup site.

46. The method of claim 45 wherein the remote backup site upon moving data to persistent storage provides the persisted data's timestamp to the primary host, wherein all data in the summary log which has the equivalent or earlier timestamp is removed.

47. A method for deploying an appliance-based business continuance system in which data resynchronization time is minimized after backup system component failure, comprising:
  integrating computer-readable code into the system, wherein the code in combination with the system is capable of:
    intercepting data requests made to a primary host machine;
    collecting information associated with the intercepted data requests;
    storing the collected information at a summary log, wherein
      the summary log is located at the primary host machine providing the collected information to a business continuance appliance, wherein
      the business continuance appliance provides a copy of the collected information to a remote backup site, wherein
      the remote backup site maintains a secondary copy of the data located at the primary data storage, whereby,
      the summary log is utilized to minimize resynchronization time in the event of the combined failure of the business continuance appliance and the remote backup site, wherein the summary log is maintained by compressing the summary log contents upon the summary log reaching its capacity.

48. The method of claim 47 wherein compressing comprises reducing the amount of collected information associated with each data request so that only a summary of the collected information associated with each data request is maintained.

49. The method of claim 48 wherein the decision as to which information to summarize comprises identifying the collected information within the summary log which is the oldest and summarizing the collected information from the oldest to the most recent collected information until there is adequate room in the summary log to begin storing the collected information.

50. The method of claim 49 further comprises identifying multiple update requests which are within an identifiable group and replacing the collected information associated with each of the multiple update requests with a single record of information describing the update to the identifiable group.

* * * * *